March 29, 1960

C. M. RADER 2,930,568

HANGER FOR ELECTROLYTIC LIQUID TREATING DEVICE

Filed Jan. 11, 1954

CLARENCE M. RADER,
INVENTOR.

BY

ATTORNEY

United States Patent Office 2,930,568
Patented Mar. 29, 1960.

2,930,568

HANGER FOR ELECTROLYTIC LIQUID TREATING DEVICE

Clarence M. Rader, Monterey Park, Calif.

Application January 11, 1954, Serial No. 403,282

1 Claim. (Cl. 248—317)

This invention relates to the electrolytic treatment of water and particularly to a device adapted for accomplishing such treatment in a hot water heater. Using the term generically as covering all kinds of hot water heaters, boilers and the like, "water heaters," in all forms, have been subject to deposits of minerals in the water on the inner metal surfaces of the heater which impairs the heating efficiency of the latter, facilitates corrosion of the metal and causes overheating and burning of the metal due to the insulating effect of the scale deposits which prevents the metal being properly cooled by the water.

It has long been the practice to treat the water being heated in a water-heater with a galvanic battery submerged in the water, the electrolytic action of the battery operating on the minerals suspended on the water so as to convert said minerals into a precipitant which sinks into a sump in the heater and has no capacity for adhering to the metal wall of the heater. The battery used for this purpose comprises a series of galvanic cells each of which comprises a copper electrode and a zinc electrode, it being common practice to string these electrodes spaced by metal collars on a rod and then to mount the assembled battery in the heater. This battery sets up an electrolytic force which not only results in the precipitation of the salts and minerals suspended in the water, but also has the beneficial effect of causing scale previously deposited on the inner surface of the heater to be converted into a form of precipitant which falls away from the metal leaving the metal surface clean.

The problem of inexpensively manufacturing and mounting such a galvanic battery in a standard water heater has not heretofore been completely solved.

It is an object of the present invention to provide an electrolytic liquid treating device which is inexpensive to produce and which may be readily installed in a standard water heater without the use of tools and by unskilled labor.

It is another object of the invention to provide a method of producing said device in which the latter may be inexpensively produced and yet cause the product to possess lasting qualities which will give it a life substantially co-extensive with that of the water heater in which it is used.

The manner of accomplishing the foregoing objects as well as further objects and advantages will be made manifest in the following description taken in connection with the accompanying drawings in which Fig. 1 is a side elevational view of a standard domestic water-heater partially broken away to illustrate the installation therein of a preferred embodiment of the device of the present invention.

Figure 1:
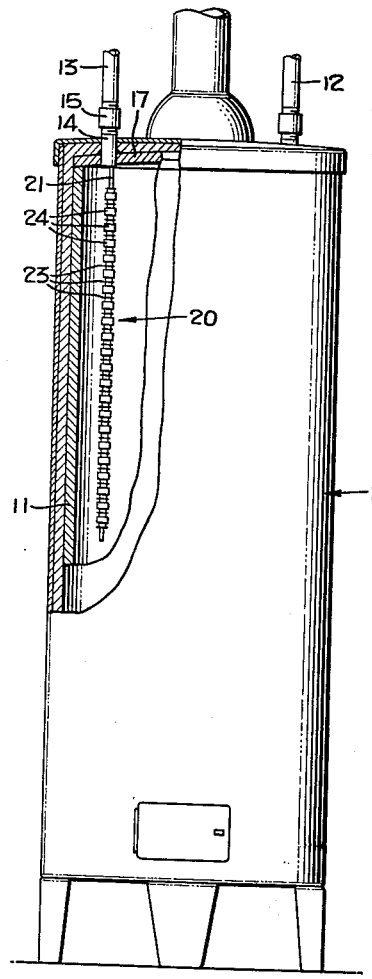

Referring specifically to the drawings, Fig. 1 shows a standard domestic water heater 10 including a metal hot water tank 11 having a cold water inlet pipe 12 and a hot water outlet pipe 13. The latter pipe connects with tank 11 through a short nipple 14 to which said pipe is connected by a coupling 15, the latter being screwed on to the upper end of said nipple. The lower threaded end of said nipple is screwed into a threaded hole 16 provided in the top wall 17 of the tank 11.

An electrolytic water treating device 20, comprising a preferred embodiment of the device of the present invention is suspended in and from the nipple 14.

The device 20 includes a rod 21 which is preferably made of stainless steel. An initial step in the manufacture of the device 20 constitutes upsetting the rod 21 by pinching opposite portions of the same to expand these into stop lugs 22. A series of pairs of copper and zinc electrodes 23 and 24 respectively, separated by spacer collars 25 are now fed onto the rod 21 to form a series of galvanic cells 26 each of which comprises one electrode 23 and one electrode 24 separated by a spacer collar 25. The entire series of galvanic cells 26 taken in its entirety comprises the galvanic battery 27 of the device 20.

The collars 25 are preferably made of brass, and collars 28, also of brass, and which are considerably heavier than collars 26, are employed as the spacers between the endmost pairs of electrodes 23 and 24 in the battery 27. The reason for the collars 28 being heavier in construction than the collars 25 will be made manifest hereinafter.

When the battery 27 has been assembled on rod 21 below the stops 22, the battery is compressed between a compresser head 29 engaging the upper end of rod 21 and a pair of supporting members 30 which contact the lower end of the battery 27 on opposite sides of the rod 21. When the battery 27 has been compressed axially with a very substantial compressive force in the order of 250 to 300 lbs., which considerably reduces the length of the assembled battery, the shaft 21 is upset by a pinching action at a point directly below the lowermost electrode 23 of the battery 27 to produce stop lugs 31 upset from said shaft which trap the battery 27 in its longitudinally compressed condition on the rod 21.

The heavier spacers 28 are provided at opposite ends of the battery 27 to withstand the high pressure of the stops 22 and 31 and so that these stops will not be caused to penetrate said spacers and thus relax said pressure.

Figure 4:
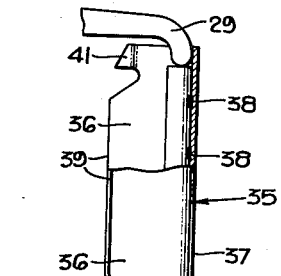
Fig. 4 is an elevational view of said device illustrating the method of manufacturing the same.

The rod 21, with the battery 27 assembled thereon, is now removed from the press employed in compressing the battery, and a hanger 35 is spot-welded to the upper end of the rod 21 as indicated in Fig. 4. The hanger 35 is preferably formed of a flat, rectangular piece of relatively thin, flexible, stainless steel, bent along its major axis into a V-shape including wings 36 which join at a rounded vertex 37 within which the rod 21 snugly fits and in which it is welded to the hanger 35 at a plurality of spots 38 as shown in Fig. 4.

When the piece of sheet metal forming the hanger 35 is thus bent, it forms wings 36 the free edges 39 of which are disposed in parallel vertical relation and are spaced apart just far enough so that these wings have to be pressed together slightly to permit the hanger 35 to be pushed downwardly into the nipple 14. The edges 39 are rounded at their lower ends, as indicated in Fig. 2, to assist the hanger 35 to penetrate the upper end of the nipple 14 when it is pressed downwardly with the hanger positioned relative to the nipple as shown in Fig. 3.

Figure 3:
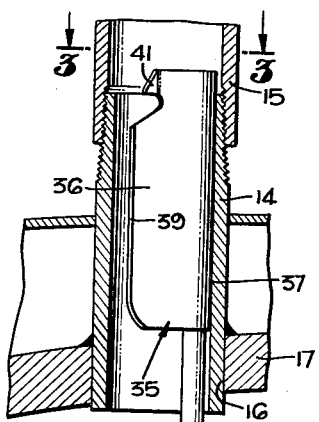
Fig. 3 is an enlarged horizontal sectional view taken on the line 3—3 of Fig. 2, and illustrates the manner in which the hanger of the device of the invention is fixed in the hot water outlet nipple of the heater for the purpose of suspending said device therefrom.

It is to be noted here that the battery 27 and hanger 35 are spaced apart on the rod 31 a distance approximately equal to the length of the nipple 14, this being necessary to permit the hanger 35 to be shifted into alignment with the bore of the nipple 14 as shown in Fig. 3 after the battery 27 has been delivered downwardly entirely through said nipple because, as shown in Fig. 3, it is necessary for the battery to be in concentric relation with the nipple 14 when passing through the same and it is also necessary for the battery to be shifted to eccentric relation with the nipple in order for the hanger 35 to be in concentric relation to the nipple and thus be ready to be pressed downwardly into said nipple.

Figure 2:
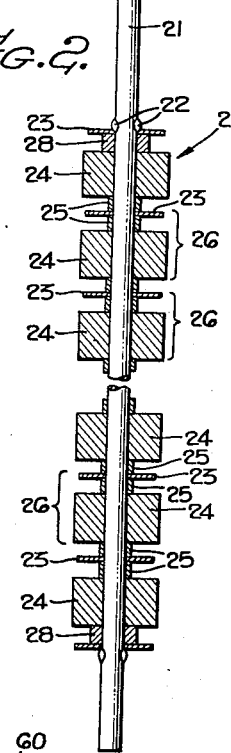
Fig. 2 is an enlarged vertical sectional view of said invention taken substantially in the same plane as the broken away portion of Fig. 1 as shown in section.

The free edges 39 of the wings 36 are notched near their upper ends to form tabs 41 which are bent outwardly so as to overlie the upper end of the nipple 14 and come to rest thereon as shown in Figs. 2 and 3 when the hanger 35 has been pressed downwardly into fully installed position in the nipple 14.

Owing to the fact that the wing edges 39 are parallel with the vertex 37 of the hanger 35, each of these elements makes a straight line contact with the bore of the nipple 14, the result of which is to rigidly mount the rod 21 in parallel relation with said nipple. Thus the device 20 is at all times maintained in parallel relation with the heater as shown in Fig. 1 no matter what position the heater may be placed in.

Figure 5:
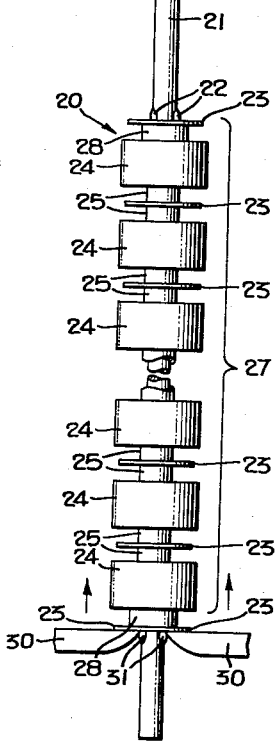
Fig. 5 is an elevational view of a modified form of the hanger employed in said device.
Figure 5:
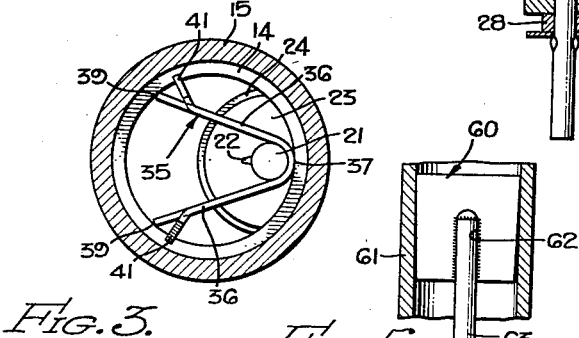

While the construction for the hanger 35 shown in Figs. 2, 3 and 4 is preferable, under some circumstances it is not practical to employ outstruck supporting tabs 41, in which case a form of supporting hanger 60 illustrated in Fig. 5 may be substituted for the hanger 35.

The hanger 60 comprises a flat rectangular sheet of stainless steel the opposite edges of which are substantially parallel and which fits quite snugly into the bore of a nipple 61 diagrammetically shown in this view. The hanger 60 may be die-stamped to form a vertical half-round depression 62 therein into which the upper end of the rod 63 fits, where it is welded to the hanger 60 so that when the latter is forced axially downwardly into the bore of the nipple 61 the hanger 60 is diametrally disposed in the nipple and compressed within the latter so as to support an electrolytic device mounted on the rod 63 with said device coaxially disposed relative to the nipple 61.

The hanger 60 is quite serviceable in certain places and has the advantage of always being in concentric relation with the rod 63 and any treating device mounted thereon. The rod 63 may thus be considerably shorter than the rod 21, as the space between the hanger 60 and the upper end of the electrolytic device provided on rod 63 may be much less than the length of nipple 14 without interfering in any way with the insertion of said device downward through said nipple and the installation of the hanger 60 in the bore of said nipple.

While the method of the invention, of making the treating device thereof, is preferably performed by making the stops 22 before assembling the battery 27 on the rod 21, and then forming the stops 31 after the various elements of the battery have been compressed against the stops 22, said method may also be advantageously performed under certain circumstances by assembling and compressing the electrodes and spacers of the battery 27 on the rod 21 and while holding the same under such compression forming the stops 22 and 31 at opposite ends of the battery by simultaneous pinching operations.

Whichever of the two above described ways which the method of the invention is performed, the net results are identical in that the battery is retained on the rod 21 by the stop pinching operation with the various elements of the battery maintained under a high degree of axial compression.

It has been found that the internal stresses set up in the metal elements of the battery 27 arranged serially on the rod 21 by the axial compression with which they are invested by said method of assembly, causes these elements to remain in good electrical contact and thus assures that the battery 27 will continue to function with its full operative strength, without attention, for several years.

What I claim is:

A device for supporting a means for electrolytically treating the water in a water heater having a hot water outlet nipple extending upwardly from said heater, said device comprising: a metal rod; a hanger comprising a flat sheet of metal bent to form a V with the vetrex portion thereof embracing a substantial upper end portion of said rod and being spot welded thereto, said sheet thus providing two divergent wings lying in flat planes parallel with and tangent to said rod, and with the outer edges of said wings substantially parallel, said edges, when said device is in use, yieldably engaging the bore of said nipple while said vertex portion of said hanger also engages said bore, said hanger thereby tending to frictionally support said device in said water heater; and tabs out-struck from outer upper corners of said wings to overlie the upper end of said nipple, when said device is in use, to positively support said hanger in said nipple.

References Cited in the file of this patent

UNITED STATES PATENTS

| | | |
|---|---|---|
| 158,068 | Hamilton | Dec. 22, 1874 |
| 728,118 | Lehmann | May 12, 1903 |
| 770,281 | Green | Sept. 20, 1904 |
| 779,326 | Stewart | Jan. 3, 1905 |
| 884,315 | Carroll | Apr. 7, 1908 |
| 2,540,074 | Butler | Feb. 6, 1951 |
| 2,603,596 | Vangsnes | July 15, 1952 |
| 2,609,340 | McMahon et al. | Sept. 2, 1952 |
| 2,744,708 | Bedford | May 8, 1956 |